United States Patent
Garaygay et al.

(10) Patent No.: US 9,802,696 B2
(45) Date of Patent: Oct. 31, 2017

(54) METHOD AND APPARATUS FOR CONTROL OF A STEERABLE LANDING GEAR

(71) Applicants: Airbus Operations Limited, Bristol (GB); Airbus Operations SAS, Toulouse (FR)

(72) Inventors: Cecile Garaygay, Bristol (GB); Louis-Emmanuel Romana, Toulouse (FR); Matthieu Mayolle, Toulouse (FR)

(73) Assignees: Airbus Operations Limited, Bristol (GB); Airbus Operations SAS, Toulouse (FR)

( * ) Notice: Subject to any disclaimer, the term of this patent is extended or adjusted under 35 U.S.C. 154(b) by 44 days.

(21) Appl. No.: 15/016,677

(22) Filed: Feb. 5, 2016

(65) Prior Publication Data

US 2016/0231745 A1    Aug. 11, 2016

(30) Foreign Application Priority Data

Feb. 5, 2015    (GB) .................................. 1501939.1

(51) Int. Cl.
| | |
|---|---|
| *B64C 25/50* | (2006.01) |
| *G05D 1/02* | (2006.01) |
| *B64C 19/00* | (2006.01) |

(52) U.S. Cl.
CPC .............. *B64C 25/50* (2013.01); *B64C 19/00* (2013.01); *G05D 1/0202* (2013.01)

(58) Field of Classification Search
CPC ........ G05D 1/0202; B64C 25/50; B64C 19/00
See application file for complete search history.

(56) References Cited

U.S. PATENT DOCUMENTS

| | | | |
|---|---|---|---|
| 4,180,223 A | 12/1979 | Amberg | |
| 4,482,961 A | 11/1984 | Kilner et al. | |
| 7,369,927 B2* | 5/2008 | Hille | B60W 30/04 280/5.502 |
| 8,521,365 B2 | 8/2013 | Chatrenet et al. | |
| 8,630,750 B2* | 1/2014 | Tada | G05D 1/0083 244/50 |
| 2011/0303785 A1 | 12/2011 | Delloue et al. | |
| 2012/0046834 A1 | 2/2012 | Lemay et al. | |
| 2012/0158218 A1 | 6/2012 | Funabiki et al. | |

(Continued)

FOREIGN PATENT DOCUMENTS

| | | |
|---|---|---|
| EP | 1 574 923 A2 | 9/2005 |
| WO | 2008/097260 A2 | 8/2008 |

(Continued)

*Primary Examiner* — Michael J Zanelli
(74) *Attorney, Agent, or Firm* — Nixon & Vanderhye P.C.

(57) ABSTRACT

A slip-reduction control unit for an aircraft having a steerable landing gear. The control unit receives steering input signals from which a target steering command output may be ascertained and additional input signals (a) the motion of the aircraft, (b) a steering angle, or (c) a parameter relating to the slip sustained by the steerable landing gear. The slip-reduction control unit determines, based on the additional input signals, reduces the rate of change of steering angle that would otherwise be commanded. The reduction in the rate of change may reduce vibration on the aircraft that might be caused by a greater rate of change in the steering angle.

17 Claims, 8 Drawing Sheets

(56) References Cited

U.S. PATENT DOCUMENTS

| | | | |
|---|---|---|---|
| 2013/0015290 A1* | 1/2013 | Benmoussa | B64C 25/50 244/50 |
| 2014/0156113 A1 | 6/2014 | Benmoussa et al. | |
| 2014/0209739 A1 | 7/2014 | Mayolle et al. | |
| 2016/0272306 A1* | 9/2016 | Roberts | G05D 1/0202 |

FOREIGN PATENT DOCUMENTS

| | | |
|---|---|---|
| WO | 2014/076485 A1 | 5/2014 |
| WO | 2014/076486 A1 | 5/2014 |

\* cited by examiner

METHOD AND APPARATUS FOR CONTROL OF A STEERABLE LANDING GEAR

RELATED APPLICATION

The present application claims priority to UK Patent Application Number 1501939.1, filed Feb. 5, 2015, the disclosure of which is entirely incorporated by reference.

BACKGROUND OF THE INVENTION

The present invention concerns method and apparatus for control of a steerable landing gear. More particularly, but not exclusively, this invention concerns a method of controlling the steering of a steerable landing gear on an aircraft with the aim of reducing undesirable vibration of the aircraft that might otherwise be caused. The invention also concerns a control apparatus for controlling the steering of a steerable landing gear on an aircraft for such a purpose, and also associated software. The invention also concerns an aircraft employing such a control method or apparatus.

When controlling the motion of an aircraft during taxiing operations on the ground, there may be circumstances in which vibrations are felt within the aircraft during certain manoeuvres. Vibration may be felt particularly when turning the aircraft by means of using a steerable landing gear. The inventors of the present invention have explored whether assisted, automatic, or semi-automatic control of the aircraft on the ground when turning might provide a means for reducing such vibration. There are various prior art documents concerning control systems for use when an aircraft is performing manoeuvres on the ground, including US 2014/0209739, U.S. Pat. No. 8,521,365, WO 2014/076485, WO 2014/076486, and those documents are mentioned and described in further detail below.

US 2014/0156113 describes a method of controlling the steering of a nose landing gear of an aircraft on the ground in which a steering angle position setpoint is set in dependence on the longitudinal speed and the yaw rate of the aircraft, those being characteristics of the movement of the aircraft, and without reliance on a measurement from a sensor for measuring the rotational position of the nose landing gear.

US 2012/0046834 describes a method of controlling the steering of a nose landing gear of an aircraft on the ground by means of utilising a closed-loop control system which controls to a yaw rate setpoint as compared to a measured yaw rate.

U.S. Pat. No. 4,482,961 describes a control system for assisting the control of the travel of an aircraft along a runway during landing, particularly under conditions of combined crosswind and low runway friction. Aircraft rudder control, nose landing gear steering control and differential braking are used to varying degrees depending on the phase of the landing operation (speed of the aircraft/weight on ground). U.S. Pat. No. 4,482,961 suggests seeking to limit the aircraft ground velocity slip angle to a range wherein an increase in ground velocity slip angle results in increased lateral corrective force on the aircraft (i.e. ensuring that the slip is maintained within a beneficial range on the slip-curve). To achieve this, the partial derivative of the aircraft lateral acceleration with respect to ground velocity slip angle is calculated and utilized by the control system. Such a partial derivative may be calculated by dividing the partial derivative of the aircraft lateral acceleration with respect to time by the partial derivative of the ground velocity slip angle with respect to time and this is suggested in US '961. In U.S. Pat. No. 4,482,961, there is described a steering controller that is arranged to issue a steering control signal that actuates the steering of the nose landing gear and that generates the steering control signal in dependence on a ground velocity slip angle and other control variables being either proportional to, or integrals of, parameters concerning aircraft velocity, the ground velocity slip angle, the ground roll course error signal (the difference between current direction of travel and the target direction of travel), aircraft yaw rate and aircraft yaw position. U.S. Pat. No. 4,482,961 is concerned with controlling the movement of the aircraft, at the aircraft-level, such that control of the nose landing gear is one part of an integrated control system.

None of the aforementioned prior art concern the problem of reducing vibration sustained by the aircraft when on the ground, however.

The present invention seeks to mitigate one or more of the above-mentioned problems. Alternatively or additionally, the present invention seeks to provide an improved apparatus and/or method for control of the motion of an aircraft during manoeuvres on the ground, such as taxiing. Alternatively or additionally, the present invention seeks to provide an improved apparatus and/or method for control of the steering of a steerable landing gear of an aircraft during manoeuvres on the ground, such as taxiing.

SUMMARY OF THE INVENTION

The present invention provides, according to a first aspect, a slip-reduction control unit employed on an aircraft having a longitudinal axis and a steerable landing gear comprising one or more steerable wheels, wherein:

(i) the slip-reduction control unit is arranged to receive a steering input signal from which a target steering command output may be ascertained, (ii) the slip-reduction control unit is arranged to receive one or more additional input signals concerning at least one of (a) the motion of the aircraft, (b) a steering angle, and (c) a parameter relating to the slip sustained by the steerable landing gear, and (iii) the slip-reduction control unit is arranged so that, in dependence on the one or more additional input signals, the rate of change of the angle of the one or more steerable wheels that would otherwise be commanded is reduced.

According to a second aspect of the invention there is also provided a method of reducing vibration on an aircraft caused by the steering effected by a steerable nose landing gear comprising a step of controlling the rate of change of the angle of the steerable nose landing gear.

According to a third aspect of the invention there is also provided an aircraft including a slip-reduction control unit as defined in any aspect of the present invention as claimed or described herein, including any optional features relating thereto, or including a slip-reduction control unit arranged to perform the method as defined in any aspect of the present invention as claimed or described herein, including any optional features relating thereto.

According to a fourth aspect of the invention there is also provided a slip-reduction control unit, when provided separately from the aircraft, the slip-reduction control unit being as defined in any aspect of the present invention as claimed or described herein, including any optional features relating thereto.

According to a fifth aspect of the invention there is also provided a computer program product configured to cause, when the computer program is executed, a computer implemented aircraft slip-reduction control unit to perform the function of the slip-reduction control unit as defined in any aspect of the present invention as claimed or described herein, including any optional features relating thereto, or to perform the step of controlling the rate of change of the angle of the steerable nose landing gear as defined in any aspect of the present invention as claimed or described herein, including any optional features relating thereto.

DESCRIPTION OF THE DRAWINGS

It will of course be appreciated that features described in relation to one aspect of the present invention may be incorporated into other aspects of the present invention. For example, the method of the invention may incorporate any of the features described with reference to the apparatus of the invention and vice versa.

Embodiments of the present invention will now be described by way of example only with reference to the accompanying schematic drawings of which.

DETAILED DESCRIPTION

Embodiments of the present invention relate to a slip-reduction control unit employed on an aircraft. Other embodiments relate to a method of reducing vibration on an aircraft caused by the steering effected by a steerable nose landing gear, for example using such a slip-reduction control unit. There now follows a general description outlining the general concepts embodied by such embodiments.

The slip-reduction control unit will typically be employed on an aircraft having a longitudinal axis and a steerable landing gear comprising one or more steerable wheels, but may be provided separately from the aircraft. The slip-reduction control unit is arranged to receive one or more steering input signals from which a target steering command output may be ascertained. The slip-reduction control unit is arranged to control the rate of change (i.e. the rate of change with respect to time) of the angle of the one or more steerable wheels. The rate of change of the angle that would otherwise be commanded may be reduced for example, in particular (for example) to a lower magnitude, but non-zero, rate of change of angle. Such control/reduction is preferably effected in dependence on at least one additional input signal to the slip-reduction control unit. The slip-reduction control unit may also be arranged to receive an additional input signal concerning the motion of the aircraft. The slip-reduction control unit may also be arranged to receive an additional input signal concerning a steering angle. The slip-reduction control unit may also be arranged to receive an additional input signal concerning a parameter relating to the slip sustained by the steerable landing gear.

When controlling the motion of an aircraft during manoeuvres, such as taxiing operations, on the ground, there may be circumstances in which undesirable vibrations are felt within the aircraft (for example in the cockpit and/or in the cabin) during certain manoeuvres. This may be due to high nose landing gear ("NLG") tyre slip during turns, especially when the NLG steering is commanded to its maximum steering angle (which may be greater than 60° for example) and/or at its maximum rate (which may be 13°/sec or greater and possibly 15°/sec or greater). Simply seeking to minimise the absolute value of the slip in order to reduce such vibrations could risk affecting operational efficiency of the aircraft and could risk adversely affecting the pilot's ability to manoeuvre the aircraft efficiently whilst taxiing.

It may be that a certain level of slip is inevitable when steering the aircraft during a turn manoeuvre. It has been found that controlling the rate of change of the angle of the steerable landing gear enables, in embodiments of the present invention, a reduction in the undesirable vibration without significantly prejudicing efficient manoeuvring of the aircraft on the ground. Reducing such vibration may increase passenger and crew comfort. Reducing such vibration may additionally or alternatively ease piloting in tight turns by reducing instances of excessive nose wheel slip or simply reducing the maximum nose slip sustained when turning. Tyre wear caused by NLG slip may also be beneficially reduced. It may be that the slip reduction leads to an increase in tyre-ground friction and therefore improve manoeuvrability of the aircraft, for example leading to reduced turn width at a given speed or a faster turn for a given width of runway.

It may be that embodiments of the invention can be integrated within existing steering control systems on an aircraft. It may be that embodiments of the invention effect a reduction in the steering angle rate without any means of actuation contributing to aircraft deceleration (such as the engines or brakes).

It may be that in embodiments of the invention the slip-reduction control unit is arranged to control to the rate of change of the angle of the one or more steerable wheels, in dependence on the one or more additional input signals, by means of reducing the rate of change of the angle of the one or more steerable wheels that would otherwise be commanded, for example to a lower magnitude, but non-zero, rate of change of angle.

The rate of change of the angle of the one or more steerable wheels may be commanded, directly or indirectly, by the slip-reduction control unit. It may be that the rate of change of the angle of the one or more steerable wheels that would otherwise be commanded is (at least during part of the operation of the slip-reduction control unit) modified, not necessarily reduced, to reduce slip.

The target steering rate commanded by the slip-reduction control unit may be less than 20 degrees per second, and is preferably less than or equal to 17 degrees per second. The target steering rate commanded by the slip-reduction control unit may be greater than 8 degrees per second, and is preferably greater than or equal to 10 degrees per second.

The slip-reduction control unit may be arranged to output a steering command which is selected such that the rate of change of the angle of the one or more steerable wheels is less than a steering rate threshold value, and in particular a non-zero steering rate threshold value. Such a steering rate threshold value may be calculated in dependence on the additional input signals. It may thus be that the reduction in the rate of change of the angle of the one or more steerable wheels caused by the slip-reduction control unit is achieved by means of, and possibly only by means of, setting such a steering rate threshold value.

Certain embodiments of the present invention thus provide a slip-reduction control unit employed on an aircraft having a longitudinal axis and a steerable landing gear comprising one or more steerable wheels, wherein the slip-reduction control unit is arranged to receive steering input signals from which a target steering command output may be ascertained; the slip-reduction control unit is arranged to receive one or more additional input signals concerning at least one of (a) the motion of the aircraft, (b) a steering angle, (c) a parameter relating to the slip sustained by the steerable landing gear; and the slip-reduction control unit is arranged to output a steering command which is selected such that the rate of change of the angle of the one or more steerable wheels is less than a steering rate threshold value; and wherein the steering rate threshold value is calculated in dependence on the additional input signals.

The setting of the steering rate threshold value may be subject to an absolute maximum steering rate threshold value, for example an absolute maximum steering rate threshold value that applies irrespective of the setting of the steering rate threshold value or the value of the steering rate threshold value so set.

The steering rate threshold value may be less than 20 degrees per second, and is preferably less than or equal to 17 degrees per second. The steering rate threshold value may be greater than 8 degrees per second, and is preferably greater than or equal to 10 degrees per second.

The additional input signal concerning the motion of the aircraft may comprise an aircraft speed signal. The additional input signal concerning a steering angle may be the steering angle as commanded. The additional input signal concerning a steering angle may be the steering angle as measured. It may be that the steering angle as measured is taken from a measure of the rotational position of the one or more steerable wheels of the steerable landing gear relative to the longitudinal axis of the aircraft. It may be that the rotational position of the steerable landing gear is ascertained, at least in part, by means of a sensor, for example one or more rotation-measuring units. Each rotation-measuring unit may comprise a Rotary Variable Differential Transducer. A typical aircraft may have at least one Rotary Variable Differential Transducer (RVDT) fitted to the steerable landing gear (e.g. the nose landing gear). An RVDT provides an output signal, typically a voltage, that is dependent on, typically being proportional to, the angle of the rotational position of the steerable landing gear, and is typically linked with the hydraulics of the aircraft steering system. The rotation-measuring unit may be located on the steerable landing gear.

The one or more additional input signals may comprise both an aircraft speed signal and a steering angle signal.

It may be that the control unit is arranged such that it sets a steering rate threshold value that is at a higher value corresponding to a first speed and at a lower value corresponding to a second speed that is higher than the first speed. It may be that the control unit is arranged such that it sets a steering rate threshold value that is at a higher value corresponding to a first steering angle and at a lower value corresponding to a second steering angle that is higher than the first steering angle. It may be that the control unit is arranged such that (a) at a first steering angle, it sets a steering rate threshold value that is at a higher value corresponding to a first speed and at a lower value corresponding to a second speed that is higher than the first speed and (b) at the first speed, the control unit sets a steering rate threshold value that is at a higher value corresponding to the first steering angle and at a lower value corresponding to a second steering angle that is higher than the first steering angle.

It may be that the control unit is arranged such that it sets a steering rate, or a steering rate threshold, on the basis of a value ascertained from a look-up table that relates different values of the one or more additional input signals to different steering rate values.

It may be that the control unit is arranged such that it sets a steering rate, or a steering rate threshold, on the basis of a predefined function that relates different values of the one or more additional input signals to different steering rate values.

It may be that the control unit is arranged such that it only sets a steering rate, or a steering rate threshold, if activated and such that the control unit has no effect on other steering systems that exist on the aircraft when the control unit is not activated. The slip-reduction control unit may be arranged to be disabled independently of the larger control system.

It may be that the rate of change of the angle of the steerable wheel is modified in dependence not only on the one or more additional input signals but also on the steering input signal. Thus the position of a tiller device may be used. The rate of the tiller position change over time may be used.

The additional input signal concerning the motion of the aircraft, if used, may relate to an acceleration parameter, a direction of travel, the aircraft speed or the like.

The additional input signal concerning a parameter relating to the slip sustained by the steerable landing gear, if used, may relate to the wheel slip angle. The parameter relating to the slip may relate to where on a slip-force curve the system sits. For example, parameter relating to the slip may relate to the partial differential of slip angle with respect to lateral force between wheel and ground. The parameter relating to the slip may relate to the runway condition, and may be simply a selection from an integer number (of possibly 10 or fewer, and preferably 5 or fewer) different categories of runway condition.

It may be that the control unit is arranged to control a steerable landing gear wheel by controlling a steering rate as a function of aircraft ground speed and steering angle in an open-loop control process.

The slip-reduction control unit may be so arranged that the steering command outputted by the slip-reduction control unit effects active turning of the one or more steerable wheels by means of actuators acting, preferably directly, on the steerable landing gear.

The steering input signal may be one that directly commands a certain angle of orientation of the steerable landing gear, for example an angle that changes with time at a desired rate of change. The steering input signals may be in the form of a command requiring the steerable landing gear be set to a target steering angle, for example such that the rate of change is determined by something other than the setting of the target steering angle.

The steering input signal may be one that commands a certain rate of change of that angle.

The steering input signal may be provided by means of a human-operated moveable steering device in the cockpit. The steering input signal received by the slip-reduction control unit may be from a tiller device, namely a pilot-operable—typically but not necessarily hand-operated— steering device that facilitates steering of the landing gear. The tiller device may for example be in the form of a steering hand-wheel.

Other pilot commands that effect steering of the aircraft may be received by the slip-reduction control unit including for example, differential braking commands, rudder control, differential thrust provided by engines on the aircraft, whether issued directly by the pilot, indirectly by the pilot, or by an automated control system of the aircraft.

The slip-reduction control unit may be part of a larger control system on an aircraft for controlling manoeuvres of the aircraft. The steering input signal may be provided from an electronic aircraft control system seeking to effect a desired amount of turning of the aircraft. For example the steering input signal may be provided from an automatic pilot system. The slip-reduction control unit may be embodied by, form part of, or comprise a general steering control system. The slip-reduction control unit may comprise separate component parts, possibly being provided by physically spaced-apart sub-units/modules.

The steerable landing gear may be in the form of a nose landing gear (NLG).

The slip-reduction control unit may be used when performing a method of seeking to reduce or control slip sustained by the one or more wheels of a steerable landing gear of an aircraft which is moving on the ground, for example when taxiing. The slip-reduction control unit may be used when performing a method of reducing vibration on an aircraft caused by the steering effected by a steerable nose landing gear. Embodiments of the invention are envisaged which do not employ the slip-reduction control unit as described and claimed herein. Thus, there is provided a method of reducing vibration on an aircraft caused by the steering effected by a steerable nose landing gear comprising a step of controlling the rate of change of the angle of the steerable nose landing gear.

It may be that, a control unit sets a target rate of change of the angle of the steerable nose landing gear in dependence on the step of controlling the rate of change of the angle of the steerable nose landing gear.

It may be that, a control unit sets a target angle of the steerable nose landing gear in dependence on the step of controlling the rate of change of the angle of the steerable nose landing gear, for example such that the actual rate of change of the angle effected is consistent with the results of the step of controlling the rate of change of the angle.

It may be that a control unit, in performing the step of controlling the rate of change of the angle of the steerable nose landing gear, calculates a value (an actual value, a predicted value or a target value for example) for the rate of change of the angle, which value is then used to control the steering of the steerable nose landing gear. It may be that the method comprises a step of controlling to such a value (i.e. not just using such a value in some other context in the control system, or controlling to an integral or differential of such a value, but actually controlling to such a value itself).

In some embodiments of the invention, it may be that the step of controlling the rate of change of the angle of the steerable nose landing gear is effected by directly controlling a part of the aircraft which has an indirect effect on the rate of change of the angle of the steerable nose landing gear. It is preferred however, that the step of controlling the rate of change of the angle of the steerable nose landing gear is effected by directly controlling the rate of change of the angle of the steerable nose landing gear.

The step of controlling the rate of change of the angle of the steerable nose landing gear may be effected by setting a threshold for the maximum permitted rate of change of the angle of the steerable nose landing gear.

The step of controlling the rate of change of the angle of the steerable nose landing gear may be performed in dependence on a value concerning the motion of the aircraft. The step of controlling the rate of change of the angle of the steerable nose landing gear may be performed in dependence on a value concerning a steering angle. The step of controlling the rate of change of the angle of the steerable nose landing gear may be performed in dependence on a value concerning a parameter relating to the slip sustained by the steerable landing gear.

For example, it may be that the setting of the aforementioned threshold (for the maximum permitted rate of change of the angle of the steerable nose landing gear) is effected in dependence on such values. The values may be combined in a calculation that yields a result which is then used to control the rate of change of the angle of the steerable nose landing gear.

The method will typically (i.e. not necessarily) include a step of receiving a steering input signal from which a target steering command output may be ascertained.

The method will typically employ a control unit to perform some or all of the aforementioned steps. Such a control unit may be computer implemented. The computer hardware, such as a processor and non-transitory storage media for a computer program, on which the control unit is implemented may be hardware on the aircraft that performs other functions on the aircraft. For example, the hardware may be or form part of a general computerized steering control system. The hardware may comprise other computer implemented control processes. Such other computer implemented control processes may, in any case, have access to all of the signals and/or data needed to ascertain the parameters, signals etc. that are used in embodiments of the present invention. As such, the computer implementation of the control unit of embodiments of the present invention may be achieved solely by means of a change in software in the hardware on the aircraft that performs other steering control functions. The computer implementation of the control unit of embodiments of the present invention may be performed as a retro-fit.

The control unit used may be a slip-reduction control unit as defined in any aspect of the present invention as claimed or described herein, including any optional features relating thereto.

In those embodiments that concern an aircraft the aircraft may have one or more actuators for steering a steerable landing gear. The aircraft may have a further steering control system which is arranged to modify steering command signals that are sent to one or more actuators on the aircraft. It is preferred that the slip-reduction control unit of such an embodiment of the present invention performs a distinct and separate function from such a further steering control system. Thus, with such an arrangement, it is possible to retrofit a slip-reduction control unit onto an existing aircraft having such a further steering control system installed thereon already. It is also preferred for the slip-reduction control unit to be so installed that were the function not performed by the slip-reduction control unit there would be no significant or disabling adverse effect on the rest of the steering system of the aircraft. It may be that the slip-reduction control unit is arranged to be disabled independently of another steering system of the aircraft (and is preferably so arranged that is can be selectively so disabled).

There now follows a description of specific embodiments, including the first and subsequent illustrated embodiments.

Figure 1:
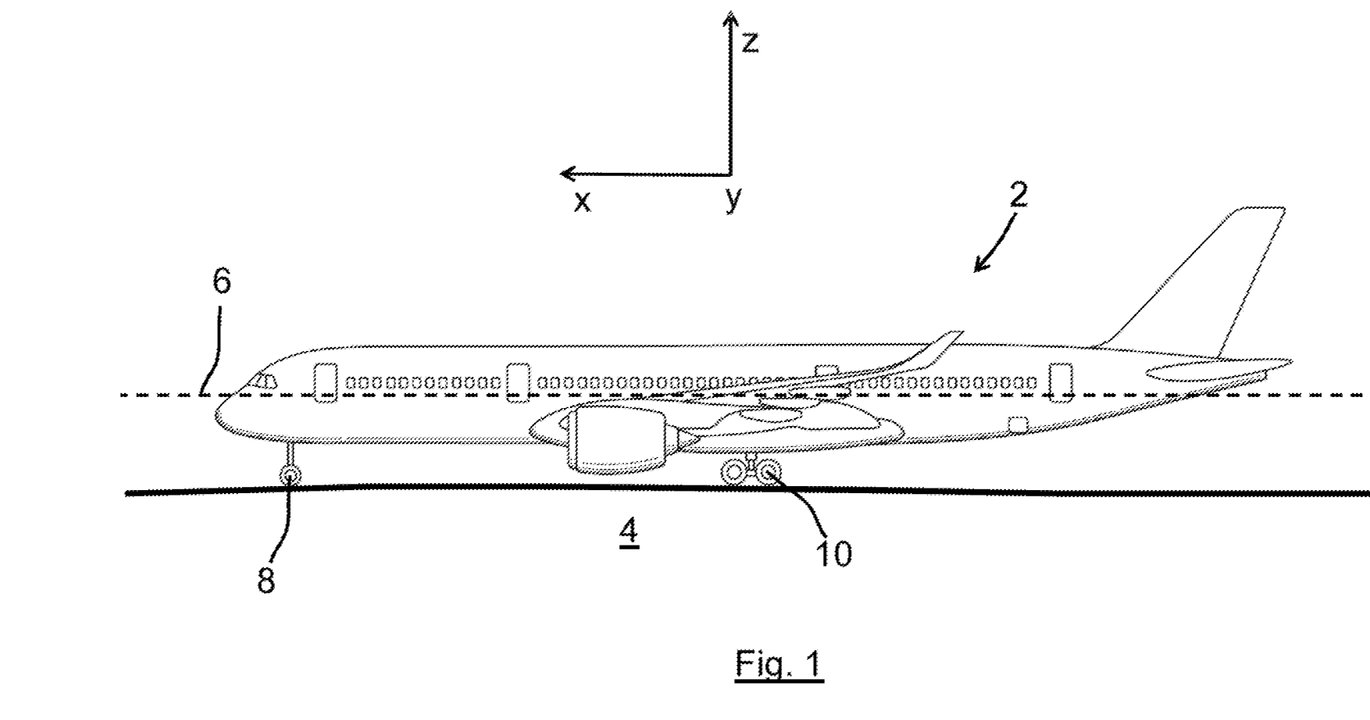
FIG. 1 is a side view of an aircraft including a steerable nose landing gear controlled according to a first embodiment of the invention.
Figure 2:
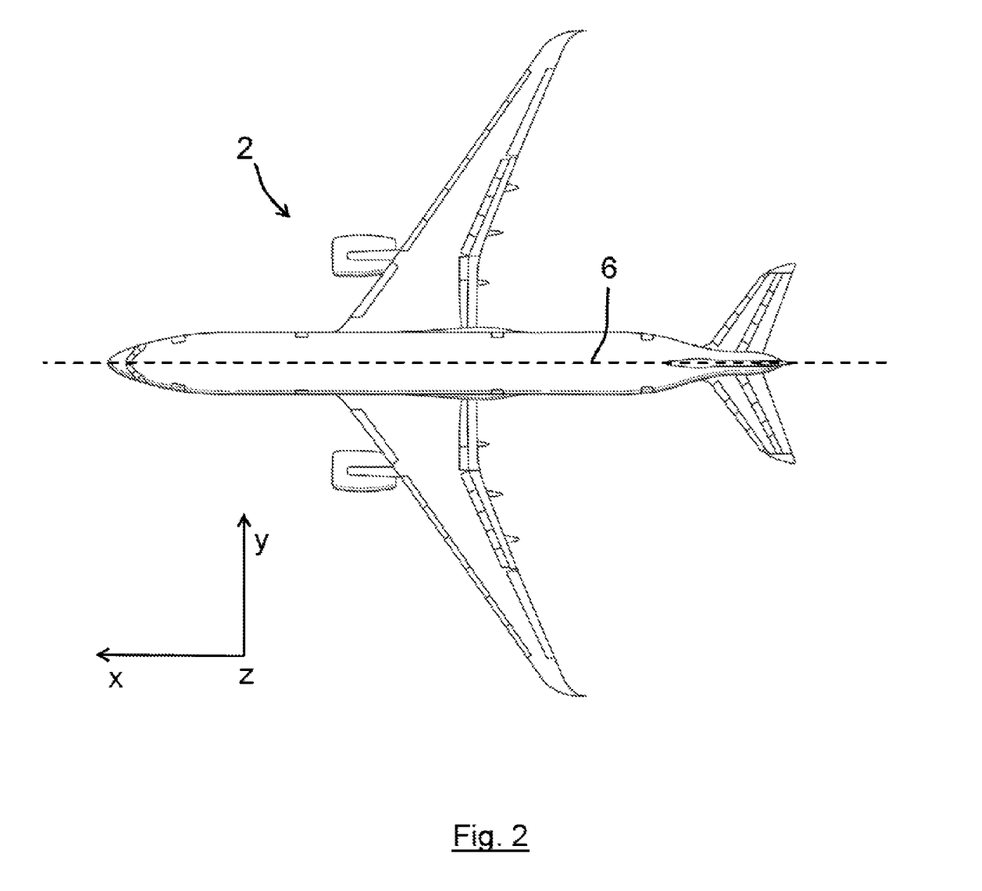
FIG. 2 is a plan view of the aircraft of FIG. 1.

The first embodiment concerns a method of reducing vibration on an aircraft caused by the steering effected by a steerable nose landing gear. The aircraft is shown in FIGS. 1 and 2. FIG. 1 is a side view of the aircraft 2 travelling on a runway 4 and illustrates the longitudinal axis 6 of the aircraft and notional x-y- and z-axes in space, the x-axis being parallel to the longitudinal axis 6, the y-axis being horizontal and perpendicular to the x-axis and the z-axis being the vertical axis. FIG. 2 shows the same aircraft 2 and the same coordinate system (x-, y- and z-axes in space). The aircraft has a steerable nose landing gear (NLG 8) comprising wheels (one only of which being shown for the sake of clarity in the drawings) which may be steered in order to effect a turning motion on the aircraft when taxiing or otherwise moving on the ground. The aircraft also has a pair of main landing gear (MLG) assemblies, only one of which (MLG 10) is visible in FIG. 1.

Figure 3:
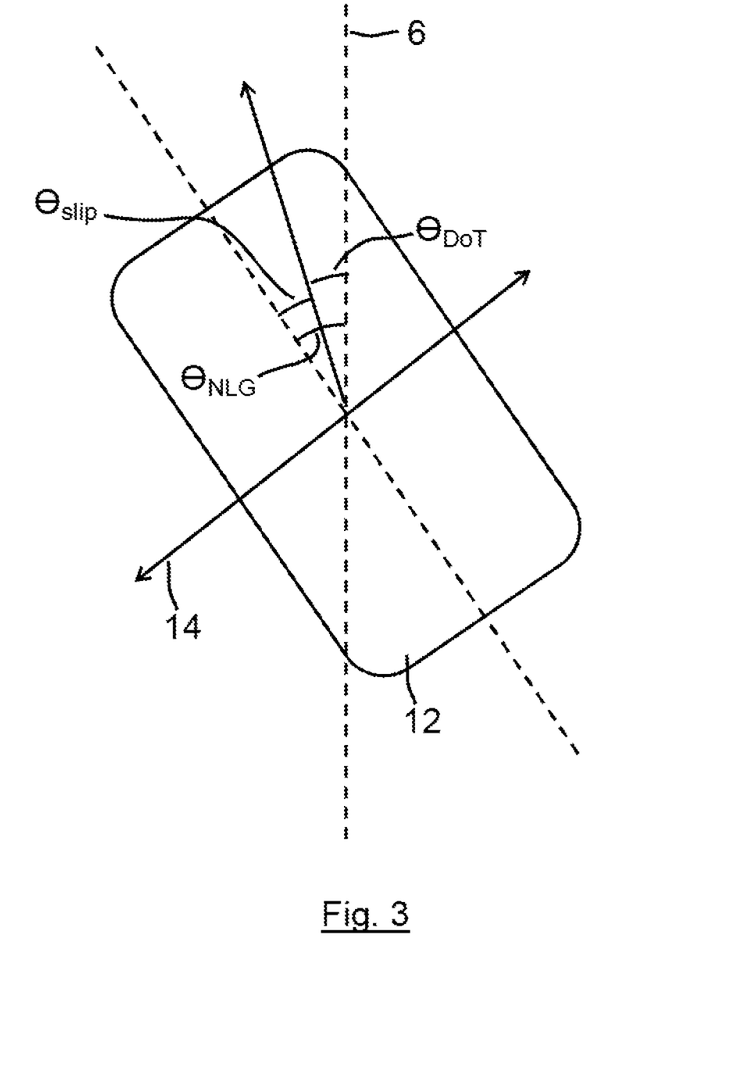
FIG. 3 is a plan view of a steerable wheel of the nose landing gear of the aircraft of FIG. 1.
Figure 4:
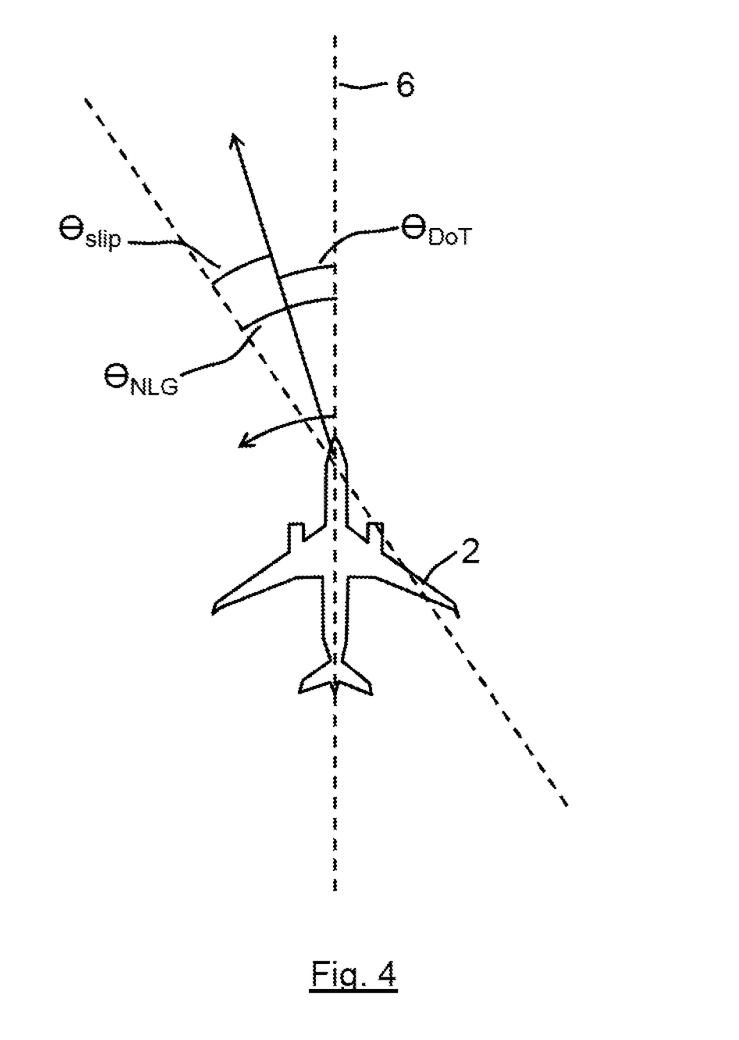
FIG. 4 is a plan view of the aircraft of FIG. 1 including an indication of the slip angle sustained by the aircraft.
Figure 5:
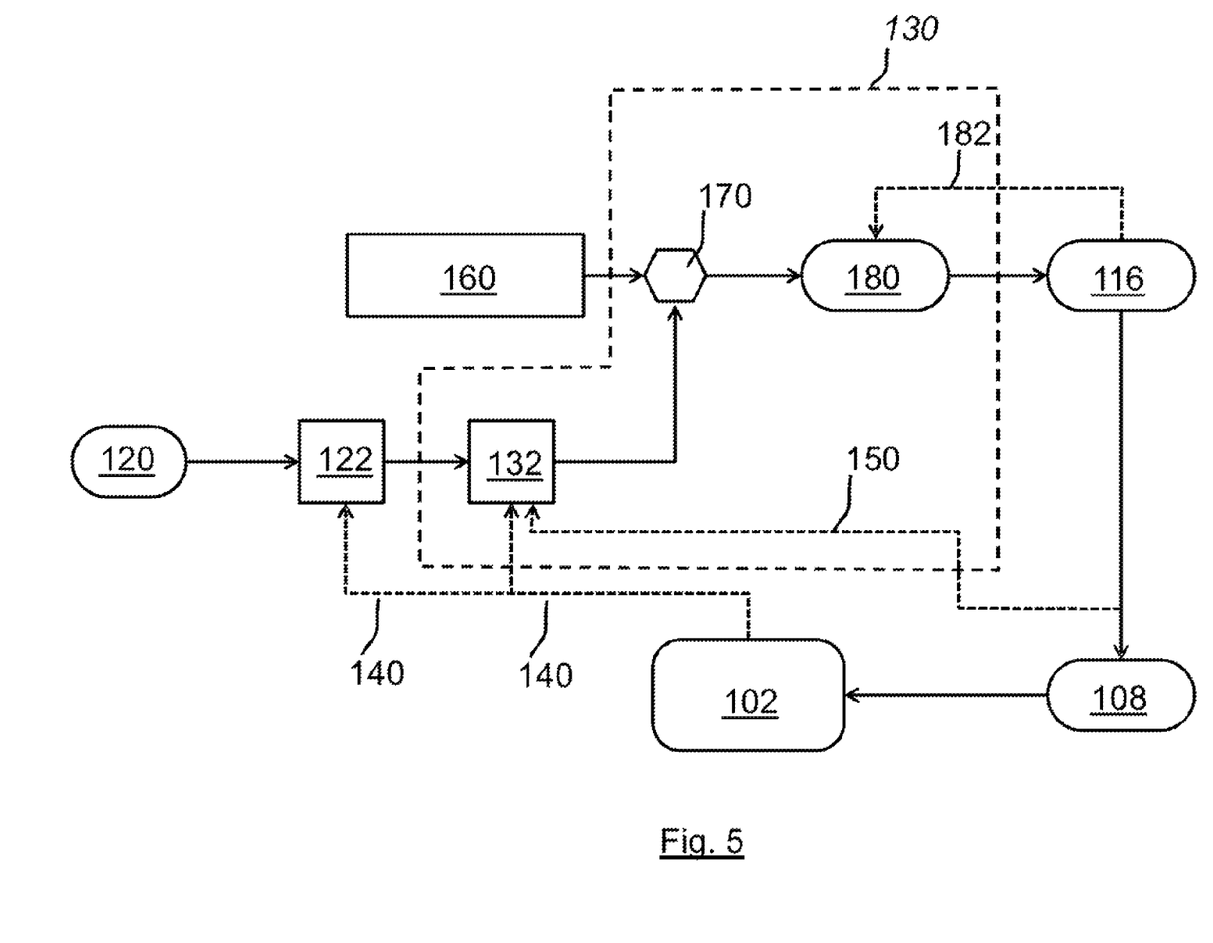
FIG. 5 is a flow chart illustrating the control of a steerable nose landing gear according to a second embodiment of the invention.

When controlling the motion of an aircraft during taxiing operations on the ground, there may be circumstances in which vibrations are felt within the aircraft during certain manoeuvres, the vibrations seemingly coming from the NLG (for example including vibrations being caused by NLG tyre slip or otherwise being induced at the NLG). It has been found that such vibrations may be reduced by controlling the rate of change of the angle of steering of the NLG. The way in which the rate of change of the angle of steering of the NLG is controlled may be achieved in different ways. In this particular embodiment, the NLG steering angle and the aircraft speed are monitored. The NLG steering angle can be ascertained from a Rotary Variable Differential Transducer (RVDT) fitted to the NLG and the aircraft speed can be derived from existing aircraft systems or a GPS device fixed to the aircraft. This particular embodiment has the aim of targeting tight turns which are performed at low speed (5 and 10 knots). There is therefore a desire to reduce the steering rate at lower speed, and less of a need to reduce the rate at higher speeds because it becomes less likely that the gear is steered to its maximum angle, at such higher speeds. (It may be that at higher speeds, the slip control unit is deactivated, because it may be deemed too difficult/impractical to attempt to reduce the slip.) Thus, if the NLG steering angle exceeds 20 degrees AND the aircraft speed is below 20 knots (or alternatively below 30 knots), where 1 knot=one nautical mile per hour≈1.85 kmh$^{-1}$, then the maximum permissible rate of steering is reduced from 15 degrees per second to 10 degrees per second. In simpler systems, the maximum permissible rate of steering may be reduced on the basis of aircraft speed alone (or alternatively on the basis of steering angle alone). Reducing the rate of change of angle of the NLG, at high speed and/or at high NLG angles, has been found to reduce vibrations caused by NLG slip against the runway. FIGS. 3 and 4 illustrate the slip angle and other variables. Thus, FIG. 3 shows an NLG wheel 12 turned at an angle $\theta_{NLG}$ to the longitudinal axis 6 of the aircraft 2. The NLG wheel sustains slip such that the angle $\theta_{DoT}$ of the direction of travel of the aircraft 2 is less than the steering angle $\theta_{NLG}$ of the NLG. The difference between the NLG angle $\theta_{NLG}$ and the direction of travel angle $\theta_{DoT}$ is defined as the slip angle $\theta_{slip}$. FIG. 4 shows the same angles as FIG. 3 but from the frame of reference of the aircraft 2. By selectively controlling the demanded rate of change of the steering angle $\theta_{NLG}$ of the NLG, the slip angle $\theta_{slip}$ can be controlled in such a way as to reduce undesirable vibration caused by slip of the NLG wheel 12 (the slip having a lateral component, where arrow 14 in FIG. 3 shows a lateral direction). It will be appreciated that the comparison of angles mentioned above (one angle being less than the other, for example) is on the basis that the absolute values of the angles are compared FIG. 5 shows a control flowchart illustrating the method and apparatus of a second embodiment of the invention. Thus, a pilot using a hand wheel (or other form of tiller) 120 to order steering of the NLG 108. This order is processed by a unit 122 which converts the pilot's orders into an NLG steering angle demand. The (modified) demand is received at a slip-reduction control unit, represented by the parts that are within the box 130. A processing unit 132 receives the signal from the unit 122 together with a signal 140 representing the speed of the aircraft 102 and a signal 150 representing the current angle of steering of the NLG 108. If the values of the speed of the aircraft the angle of steering satisfy certain criteria (representing cases where the speed and steering angle are sufficiently low, with a very low value of one offsetting a relatively high value of the other), the processing unit 132 simply outputs the (modified) demand signal from the unit 122 without any change in the signal. This output (steering demand) is then combined at signal mixer 170 with signals from other sources 160 that may independently issues steering demands (such as an autopilot). The resultant steering demand is then passed via a NLG steering control loop unit 180 to the steering equipment 116 (including steering actuators) that effects the steering of the NLG 108 with use of a feedback loop 182. If however the values of the speed of the aircraft the angle of steering satisfy certain other criteria, the processing unit 132 outputs a yet further modified steering demand signal, such that the rate of steering of the NLG 108 (the rate of change with time of the steering angle) is limited. The modification of the steering demand signal by the processing unit 132 is greater (more heavily limited) with increasing speed and with increasing steering angle. Vibration through excessive slip of the NLG is thus reduced.

By way of further example and by way of further explanation, when initiating a turn of an aircraft by means of steering with the NLG, the following stages occur:

(i) The slip angle increases as the NLG steering angle increases. As the aircraft has barely started turning, the slip level is nearly equal to the NLG steering angle until sufficient tyre friction is reached and the aircraft turns as the steering is becoming effective. (This highlights that a minimum slip level is required for the steering to allow the aircraft to turn.)

(ii) As the steering angle keeps increasing, the slip builds up and reaches its maximum when the rate of change of direction of travel and the NLG steering angle rate are the substantially the same. The slip may be at its maximum value when the commanded NLG steering angle is reached, because there is often a delay in the rate of change of direction of travel following the NLG steering angle rate during turn initiation.

(iii) Once the commanded NLG steering angle is reached, the slip progressively reduces until a steady-state is reached.

It has been found, during simulation and analysis, that unacceptable vibrations may occur more often when the nose wheel slip angle is above a threshold corresponding to maximum lateral friction (overslip' threshold). It is believed that, in such an unstable area of the friction-slip curve, the NLG and associated tyres, due to their flexibility, act as an oscillatory spring when the friction forces are being relaxed but the slip angle remains high. In order to reduce the risk of excessive tyre slip causing unacceptable vibrations whilst maintaining suitable performance, it is preferred for the slip level to be maintained just below the overslip' threshold (i.e.

staying within the stable area of the friction-slip curve). It may however be permissible for the slip level to be exceed the overslip' threshold without the risk of the NLG steering angle increasing in an uncontrolled manner. Surprisingly, however it has been found that controlling/limiting the rate of change of the NLG steering angle in itself significantly reduces the unwanted vibration that otherwise occurs. Also there are benefits in the various proposed embodiments of the invention in that the modifications required to existing aircraft systems are rather minimal. The modifications needed may be provided within the existing steering control algorithms on current commercial aircraft systems. This yields further benefits. The reduction of the NLG steering angle rate is automatic when the normal NLG steering system is operating. The slip-reduction control employed does not use any means of actuation contributing to the aircraft deceleration. The slip-reduction control employed has minimal impact/no impact on equipment design (sizing loads or duty cycle). The system does not require any adverse changes to steering torques effected by steering actuators on the aircraft (and may in certain cases enable the steering actuators to be required to exert lower torques). The slip-reduction control system may be readily integrated with the existing steering control system whilst not affecting (being compatible with) the lateral ground control functions. Those parts of the flowchart shown in FIG. 5 that function to control/limit the rate of change of the steering angle of the NLG in order to reduce slip and/or unwanted vibration may for example be implemented in hardware, for example computerised systems of the aircraft, by means of computer software. It will be appreciated of course that similar functions may be achieved by means other than software. A suitable arranged electronic circuit, whether or not comprising a programmable processing unit, could achieve an equivalent function.

Figure 6:
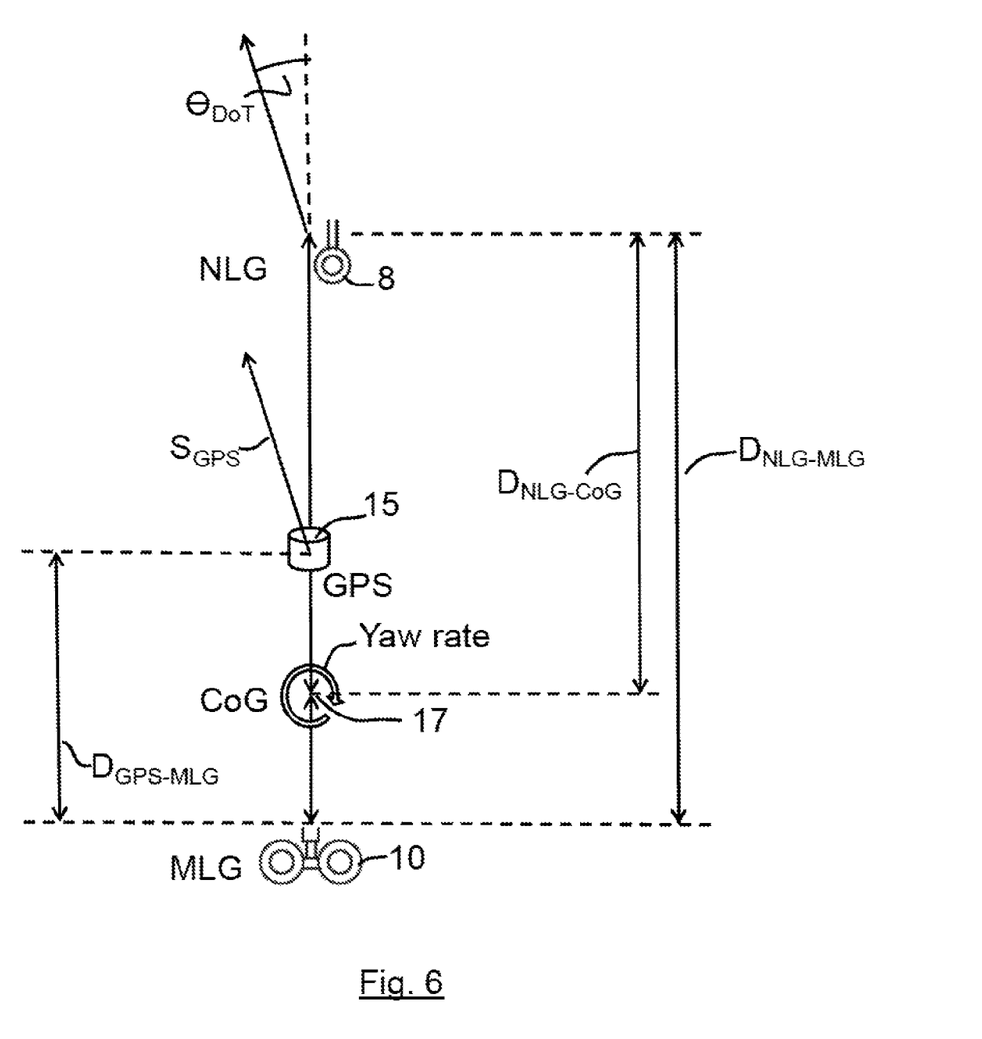
FIG. 6 is a schematic plan view showing the nose landing gear, main landing gear and centre of gravity of the aircraft of an aircraft according to a third embodiment of the invention.

In a third embodiment, a slip parameter, namely the slip angle, is also used to control the steering rate. FIG. 6 shows the geometry of the aircraft and the way in which the slip angle can be derived. Thus, FIG. 6 shows the fixed distances between the NLG 8 and the MLG 10, the yaw about the centre of gravity 17 (close to the location of the MLG) and the speed of the aircraft as measured by a GPS unit 15. As shown in FIGS. 3 and 4, the slip angle is related to the NLG steering angle, $\theta_{NLG}$, and the direction of travel angle, $\theta_{DOT}$ by:

$$\theta_{slip} = \theta_{NLG} - \theta_{DOT} \quad \text{(Equation 1)}$$

Figure 7:
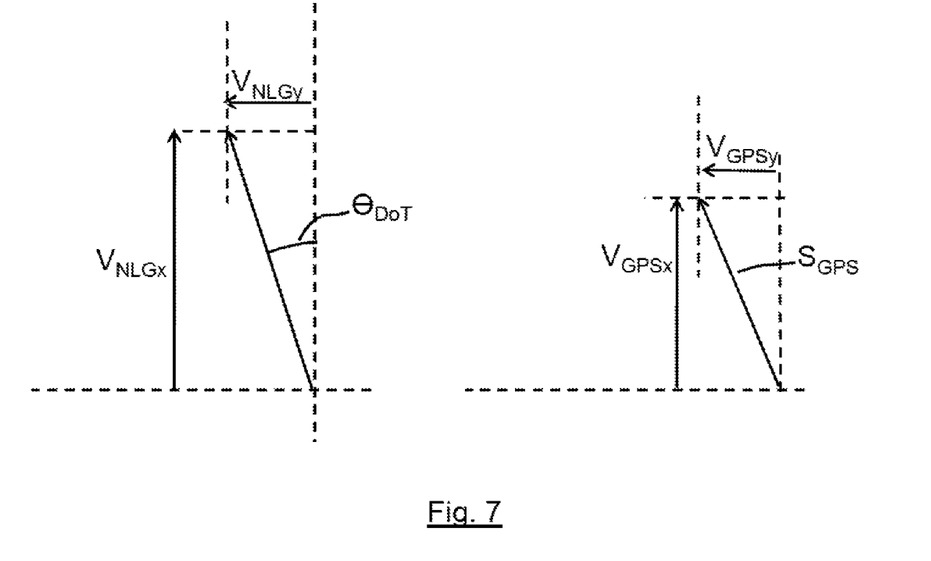
FIG. 7 illustrates a way of calculating components of motion of the aircraft.

The angle of direction of travel, $\theta_{DOT}$, at the NLG 8 can be calculated from measures of the aircraft velocity at the NLG. If the component of velocity in the x-direction (i.e. along the longitudinal axis) and the component of the NLG velocity in the y-direction (i.e. perpendicular to the longitudinal axis) are both known, the angle of direction of travel, $\theta_{DOT}$ can (see FIG. 7) be calculated from $$\tan(\theta_{DOT}) = V_{NLGy}/V_{NLGx}, \quad \text{(Equation 2)}$$

where $V_{NLGx}$ is the component of the NLG velocity in the x-direction (i.e. along the longitudinal axis) and $V_{NLGy}$ is the component of the NLG velocity in the y-direction (i.e. perpendicular to the longitudinal axis. Measures of the acceleration in x- and y-directions can be measured by accelerometers at the NLG, and the components of velocity in x- and y-directions can then be calculated by integrating the accelerometer values. Alternatively, $V_{NLGy}/V_{NLGx}$ can be calculated from other parameters, as will now be described.

Assuming that there is no MLG drift (or that the drift of the aircraft is negligible), the component of the NLG velocity in the y-direction, $V_{NLGy}$, can be assumed (see FIG. 6) to be due only to the yaw rate (at the Centre of Gravity ("CoG") of the aircraft), such that:

$$V_{NLGy} = \text{Yaw rate} * D_{NLG\text{-}CoG}$$

where $D_{NLG\text{-}COG}$ is the distance between the NLG and the CoG. The CoG is not known precisely for a given aircraft set-up but is typically near the centreline of the aircraft and in line, or near to being in line, with the position in the x-direction of the MLG. As such, the distance, $D_{NLG\text{-}CoG}$ can be assumed to be roughly equivalent to $D_{NLG\text{-}MLG}$ which is fixed and known. Thus:

$$V_{NLGy} \approx \text{Yaw rate} * D_{NLG\text{-}MLG} \quad \text{(Equation 3)}$$

Given that the aircraft can be assumed, for these purposes, to be a perfectly rigid body along its length, the component of speed in the x-direction is the same as measured at any point along the length of the aircraft. Thus, $V_{NLGx}$ can be ascertained by considering the components of the absolute speed as measured by an on-board instrument such as GPS unit 15. The position of the GPS 15 is fixed on the aircraft, and the distance, $D_{GPS\text{-}MLG}$ in the x-direction from the MLG is fixed and known. Thus, with reference to the right-angled triangle shown on the right in FIG. 7, in which $S_{GPS}$ is the absolute speed as measured by the GPS, with $V_{GPSx}$ and $V_{GPSy}$ representing the x- and y-components of the velocity of the GPS:

$$S_{GPS}^2 = V_{GPSx}^2 + V_{GPSy}^2 \quad \text{(Equation 4)}$$

If we again assume no drift, then:

$$V_{GPSy} = \text{Yaw rate} * D_{GPS\text{-}MLG} \quad \text{(Equation 5)}$$

Thus, combining equations 1, 2, 3, and 4 we have the following relationship:

$$\theta_{slip} \approx \theta_{NLG} - \tan^{-1}\left(\frac{Yawrate * D_{NLG-MLG}}{\sqrt{S_{GPS}^2 - (Yawrate * D_{GPS-MLG})^2}}\right)$$

Figure 8:
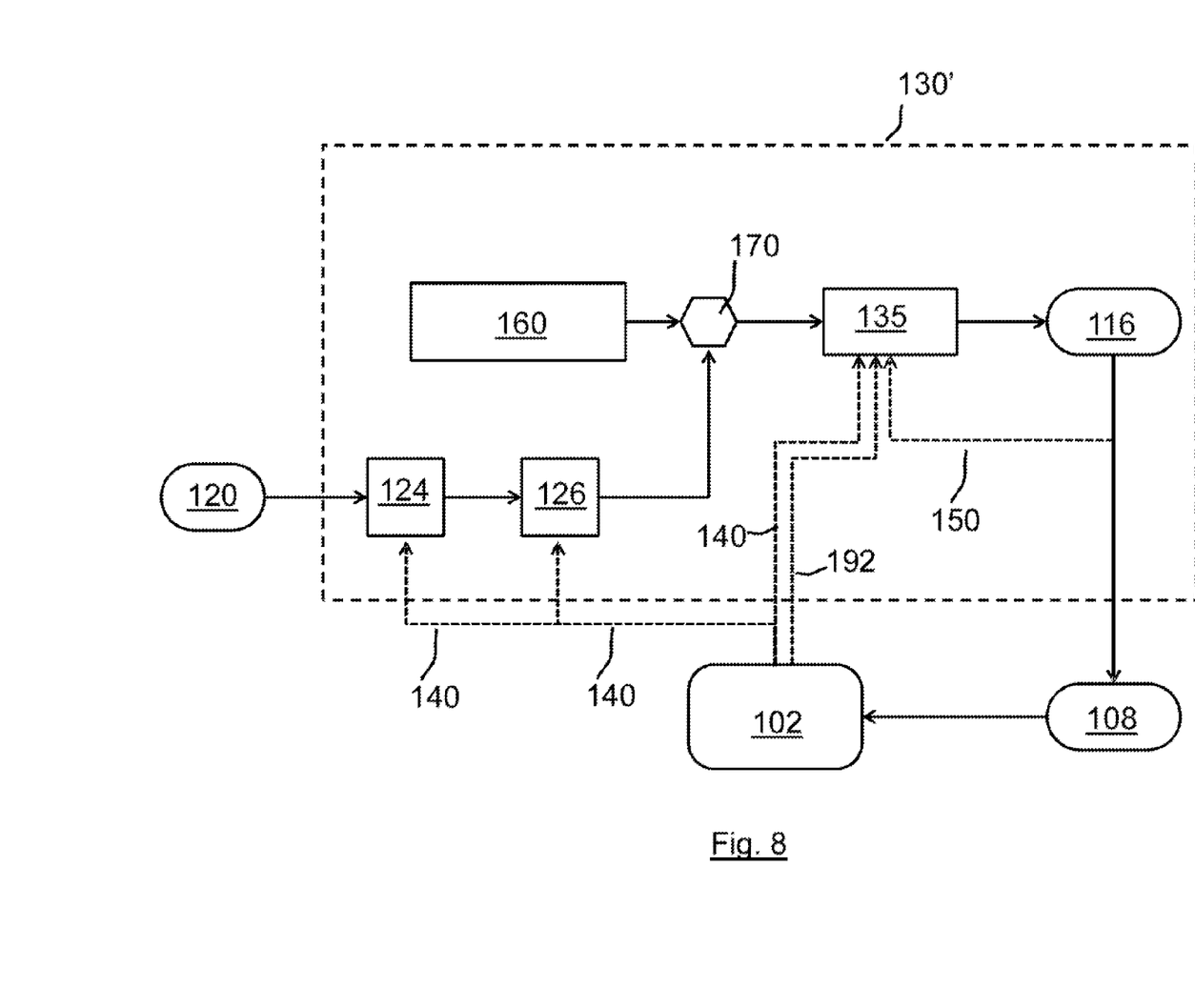
FIG. 8 is a flow chart illustrating the control of a steerable nose landing gear according to the third embodiment of the invention.

FIG. 8 shows the control flowchart illustrating the method of the third embodiment. Thus, a pilot using a tiller device 120 to order steering of the NLG 108. This order is modified by first and second units 124, 126 to convert the pilot's orders into an NLG steering angle signal is then received at a signal mixer 170 with signals from other sources 160 that may independently issue steering demands. A slip-reduction control unit 135 receives the demand signal from the signal mixer 170 and also a signal 140 representing the aircraft speed, a signal 150 representing the current angle of steering, and a signal 192 indicating the calculated slip angle. These signals are all then used in a calculation that outputs a modified steering demand signal, which controls the steering demand to achieve a target rate of change of steering angle. The calculation is such that the target rate of change of steering angle will be higher in low slip, low steering angle and/or low speed conditions and will be lower in high slip, high steering angle and/or high speed conditions. The exact formula used can be derived using simulations, modelling or experimentation in order to achieve efficient steering of the aircraft whilst reducing, and preferably substantially eliminating, undesirable vibration from the NLG. The formula for setting the steering angle rate may be constructed by means of defining various set points, or control lines (on a 3-D graph representing aircraft speed, NLG angle and steering angle rate) and then interpolating therebetween. One such control line might for example be to have a single high rate at all NLG angles less than 40 degrees, if the speed is 5 knots or below. There might then be a lower steering angle rate at a speed of 5 knots and an angle of 75 degrees. There could be a set point for a further relatively low steering angle rate at a speed of 20 knots and an NLG angle of 30 degrees. An implicit effect of the formula may be that the steering rate never exceeds a given threshold that changes according to conditions. It will be noted that the position of the component that performs the processing that control the steering rate is different in this embodiment to others described above (compare the position of the slip-reduction control unit 135 relative to the signal mixer 170 as shown in FIG. 8 with the position of the processing unit 132 relative to the signal mixer 170 as shown in FIG. 5). The steering system in this embodiment may be considered as being represented by the parts that are within the box 130', the slip-reduction control unit 135 forming a part only of such a system.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The slip-reduction control unit may in certain embodiments also receive and an indication of the condition of the runway. The condition of the runway may be manually selected from a small number of possible conditions—e.g. "dry", "wet", "flooded", "icy", each having a unique value assigned to them. Alternatively, an estimation of the mu-value (µ-value) may be provided. The condition may simply be a choice between "dry" and "not dry". For all such variations, a value corresponding to the condition of the runway may be selected manually by the pilot prior to landing, in response to information provided from the ground.

In certain embodiments, the slip-reduction control unit (or processing unit of the slip-reduction control) may consult a lookup table which sets out a table of threshold steering angle rates that depend on the values of the speed of the aircraft, the angle of steering and the condition of the runway. (The table may effectively be a three-dimensional table, given that there are three variables to consider—or may be multiple two-dimensional tables—in either case the table(s) yielding a single threshold steering angle rate depending on the values of the three variables). A high threshold rate (of 15 degrees per second) may correspond to the cases where the speed and steering angle are sufficiently low and the runway condition is good. Lower threshold rates, down to 10, will be selected in dependence on the parameters considered.

The signal mixer may receive signals from other sources that may independently issues steering demands. Such other sources may include an autopilot unit and rudder pedals. The mixer may also receive and process signals from a heading control function system.

The resultant steering demand from mixer unit 170 may itself be subject to an absolute fixed steering rate threshold such that any demand that would cause a steering rate of more than, say, 15 degrees per second (or such other value as is appropriate for the aircraft concerned) is reduced so as to effect a steering rate of no more than that absolute maximum.

It may be that under certain criteria, no threshold is actively set by the slip-reduction control unit, and the maximum steering rate achievable with the actuators and NLG of the aircraft is deemed permissible.

Another embodiment employs a control process in which, if the NLG steering angle exceeds 20 degrees OR if the aircraft speed exceeds 10 knots (1 knot=one nautical mile per hour≈1.85 kmh$^{-1}$) then the maximum permissible rate of steering is reduced from 15 degrees per second to 10 degrees per second The function used to set the steering angle rate in dependence on the input parameters may be tuned so as to optimise the nose tyre slip (for example to maximise the lateral friction force between nose tyre and ground).

Signals may be used in embodiments of the invention, such as electrical signals, such as for example a voltage, to convey data, for example the value of the angle of the NLG. Such signals may include mechanical signals such as movement of a gear or lever. In addition, it will be understood that a state of a "signal" may include zero, in which state there is no physical signal, as such. For example the states of an electric signal may include 0 volts. The signals may be digital signals and may represent data.

The control of the rate of change of the steering could be controlled with reference to a calculated slip value, alone.

It will be appreciated that where reference is made herein to slip between wheel and, for example, runway, the reality will typically be that the contact will be between the runway and a tyre of the wheel.

It will also be appreciated that where positive numbers are quoted in the context of a variable which can have negative values, any reference to other values being higher or lower would also apply in the same way to the negative values, making sign changes as appropriate.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. The word "or" means either or both unless the context of the word in the sentence indicates otherwise.

The invention claimed is:

1. A slip-reduction control unit configured to be employed on an aircraft having a longitudinal axis and a steerable landing gear including one or more steerable wheels, wherein the slip-reduction control unit is configured to (i) receive a steering input signal from which a target steering command output is ascertained, and (ii) receive one or more additional input signals concerning at least one of (a) the motion of the aircraft, (b) a steering angle, and (c) a parameter relating to the slip sustained by the steerable landing gear, and the slip-reduction control unit is configured so that, in dependence on the one or more additional input signals, a rate of change of an angle of the one or more steerable wheels that would otherwise be commanded is reduced.

2. The slip-reduction control unit according to claim 1, wherein the slip-reduction control unit is configured to output a steering command which is selected such that the rate of change of the angle of the one or more steerable wheels is less than a steering rate threshold value.

3. The slip-reduction control unit according to claim 2, wherein the steering rate threshold value is calculated in dependence on the additional input signals.

4. The slip-reduction control unit according to claim 2, wherein the steering rate threshold value is subject to an absolute maximum steering rate threshold value.

5. The slip-reduction control unit according to claim 1, wherein the one or more additional input signals comprise an aircraft speed signal and a steering angle signal representing a steering angle.

6. The slip-reduction control unit according to claim 1, wherein a steering command outputted by the slip-reduction control unit effects active turning of the one or more steerable wheels by means of actuators acting on the steerable landing gear.

7. The slip-reduction control unit according to claim 1, wherein the steering input signal received by the slip-reduction control unit comprises one or more signals from a pilot-operable steering tiller device.

8. An aircraft including the slip-reduction control unit recited in claim 1.

9. The aircraft according to claim 8, including
one or more actuators for steering a steerable landing gear and
a further steering control system configured to modify steering command signals that are sent to the one or more actuators,
wherein the slip-reduction control unit performs a distinct and separate function from the further steering control system.

10. The slip-reduction control unit of claim 1 wherein the slip-reduction control unit is provided separately from the aircraft.

11. A computer program product configured to cause, when the computer program is executed, a computer implemented aircraft slip-reduction control unit to perform the function of the slip-reduction control unit of claim 1.

12. A method of reducing vibration on an aircraft caused by steering effected by a steerable nose landing gear comprising controlling a rate of change of the angle of the steerable nose landing gear, wherein the controlling the rate of change of the angle of the steerable nose landing gear is performed in dependence on values concerning at least one of (a) the motion of the aircraft, (b) a steering angle, and (c) a parameter relating to the slip sustained by the steerable landing gear.

13. The method according to claim 12, wherein the controlling the rate of change of the angle of the steerable nose landing gear is effected by directly controlling the rate of change of the angle of the steerable nose landing gear.

14. The method according to claim 12, wherein the controlling the rate of change of the angle of the steerable nose landing gear is effected by setting a threshold for a maximum permitted rate of change of the angle of the steerable nose landing gear.

15. The method of claim 12 wherein the controlling of the rate of change of the angle of the steerable nose landing gear is performed by a slip-reduction control unit.

16. A computer program stored on a non-transitory storage media and configured to be executed by a processor in a slip-reduction control unit on an aircraft having a longitudinal axis and a steerable landing gear wheel, wherein the execution of the computer program causes the slip-reduction control unit to:
receive a steering input signal;
generate a target steering command output based on the received steering input signal;
based on the target steering command output, determine a rate of change of a steering angle to turn the steerable landing gear wheel;
receive an additional input signal indicating at least one of (a) a motion of the aircraft, (b) a steering angle for the steerable landing gear wheel, and (c) a parameter relating to slip sustained by the steerable landing gear wheel; and
based on the additional input signal, reduce the rate of change of the steering angle.

17. A method to control a steering angle of a steerable landing gear for an aircraft comprising:
receive a steering input signal;
generate a target steering command output based on the received steering input signal;
based on the target steering command output, determine a rate of change of a steering angle to turn the steerable landing gear wheel;
receive an additional input signal indicating at least one of (a) a motion of the aircraft, (b) a current steering angle of the steerable landing gear wheel, and (c) a parameter relating to a current slip sustained by the steerable landing gear wheel with respect to a runway;
determine a maximum rate of change of the steering angle based on the additional input signal;
reduce the determined rate of change to at most the maximum rate of change, and
turn the steerable landing gear wheel at the reduced determined rate of change of the steering angle.

* * * * *